United States Patent [19]
Duclaux et al.

[11] 4,051,224
[45] Sept. 27, 1977

[54] PROCESS AND APPARATUS FOR COLLECTING THE FUMES GIVEN OFF DURING THE PRODUCTION OF ALUMINIUM IN AN ELECTROLYSIS CELL WITH A CONTINUOUS ANODE

[75] Inventors: Daniel Duclaux, Lille; André J. A. Pontier; Georges Paul Ferret, both of St. Jean de Maurienne, all of France

[73] Assignee: Aluminum Pechiney, Lyon, France

[21] Appl. No.: 627,596

[22] Filed: Oct. 31, 1975

Related U.S. Application Data

[62] Division of Ser. No. 569,080, April 17, 1975, Pat. No. 4,002,551.

[51] Int. Cl.$^2$ ............................................. B01D 53/34
[52] U.S. Cl. ...................................... 423/210; 204/67
[58] Field of Search ................... 423/224, 210; 204/67

[56] References Cited

U.S. PATENT DOCUMENTS

| 2,526,875 | 10/1950 | Jouannet | 204/67 |
|---|---|---|---|
| 2,631,972 | 3/1953 | Lazzatto | 204/67 |
| 2,731,407 | 1/1956 | Sem et al. | 204/67 |
| 2,943,985 | 7/1960 | Sem | 204/67 |
| 2,947,673 | 8/1960 | Sem et al. | 204/67 |

Primary Examiner—Earl C. Thomas
Attorney, Agent, or Firm—McDougall, Hersh & Scott

[57] ABSTRACT

The invention relates to a process and an apparatus for collecting the fumes given off during the production of aluminium in an electrolysis cell with a continuous anode.

In the process, the surface of the electrolysis bath is closed, on the one hand along the long sides of the cell, by a longitudinal panel which is applied in fluid-tight manner to the anode tube, leaving an air intake free at its base, and on the other hand along the short sides of the cell by a fixed hooding closed laterally by the longitudinal panel.

The invention is applicable to cells for the igneous electrolysis of alumina comprising a continuous anode.

1 Claim, 13 Drawing Figures

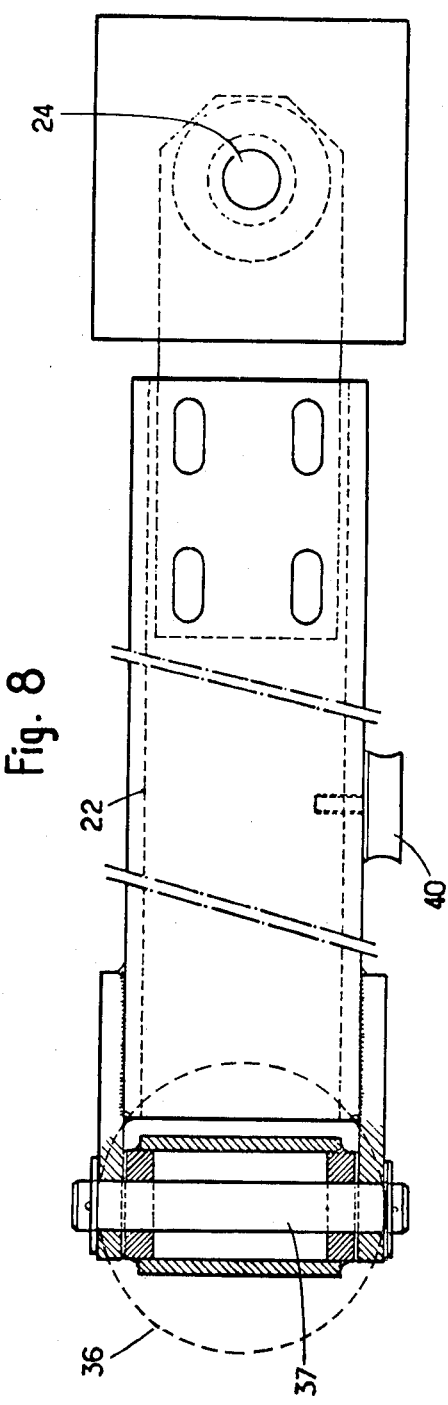
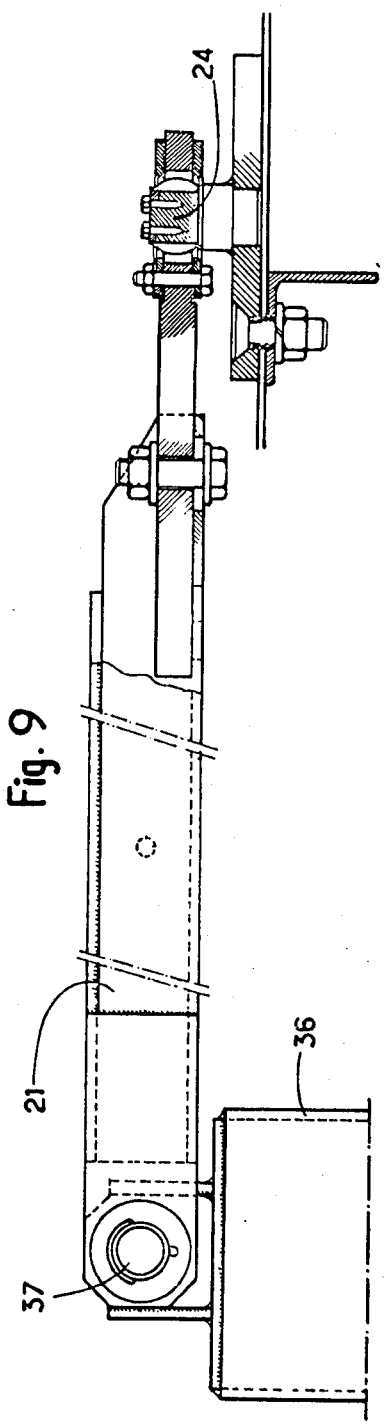

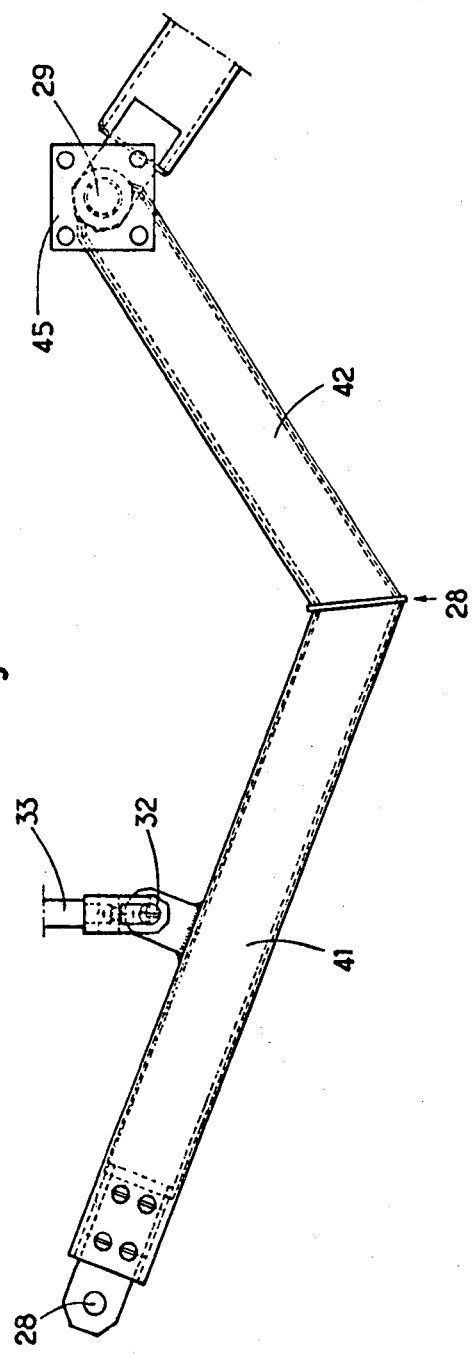
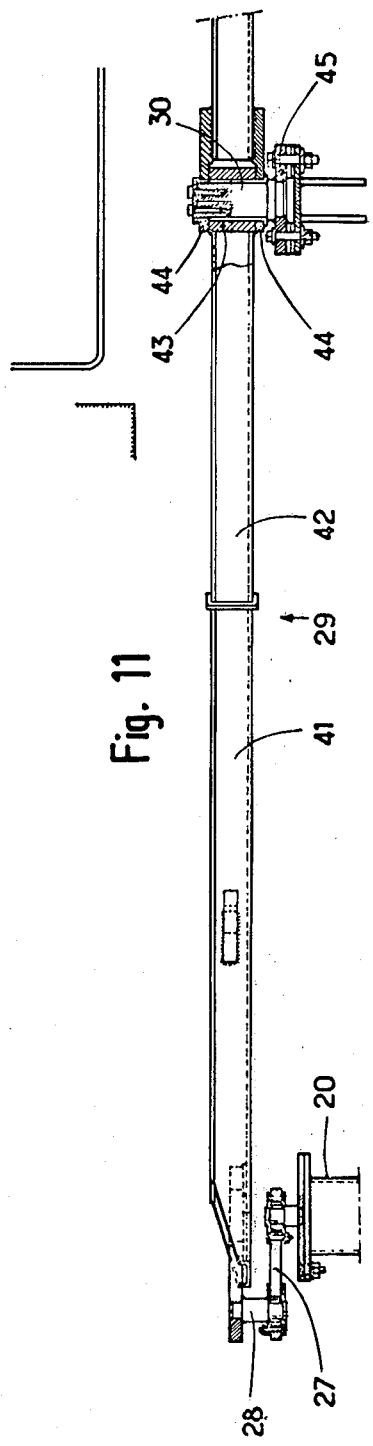

PROCESS AND APPARATUS FOR COLLECTING THE FUMES GIVEN OFF DURING THE PRODUCTION OF ALUMINIUM IN AN ELECTROLYSIS CELL WITH A CONTINUOUS ANODE

This is a division of application Ser. No. 569,080, filed Apr. 17, 1975, now U.S. Pat. No. 4,002,551.

This invention relates to a process for collecting the fumes given off during the production of aluminium in an igneous electrolysis cell with a continuous anode, and to an apparatus for carrying out this process.

The process according to the invention is intended for use in the metallurgy of aluminium by the electrolysis of alumina, more especially for recovering the fumes given off during electrolysis.

An igneous electrolysis cell with a continuous anode, also known as a "Soederberg" cell, comprises a parallelepipedic tank which is open at its upper end and whose base, formed by metal bars supporting blocks of carbon connected by a lining, acts as the cathode. This tank contains an electrolysis bath consisting of alumina dissolved in cryolite heated to a temperature in the range from 950° to 1050° C. A single anode, in the form of a carbon paste accommodated in a tube, dips into this bath. Pins are embedded in this paste, being fixed to conductive bars serving both as a metal support and a means for supplying electricity. When an electrical current is passed through the cell, the alumina decomposes into aluminium, forming a metal bath which covers the cathode, and into oxygen which is deposited onto the anode and causes the progressive combustion thereof. The carbon paste forming the anode is cooked during operation of the cell under the effect of the temperature of the electrolysis bath and the Joule effect. The lower part of the mass cokes, whilst the upper part softens. As the lower coked part is burnt by the oxygen, the carbon mass has to be pushed downwards in order to keep the anode/cathode interval constant. Accordingly, the pins have to be periodically removed and re-introduced at an upper level.

Decomposition of the alumina is accompanied by a reduction in its concentration in the electrolysis bath. When the alumina content falls below a certain limit, operation of the cell is modified, the cryolite is decomposed, resulting in the formation of a gaseous film which insulates the anode. The cell is polarised and can only be depolarised by recharging the electrolysis bath with alumina.

Combustion of the anode is accompanied by the emission of fumes consisting of gases such as carbon dioxide, carbon monoxide, sulphur dioxide, gaseous hydrofluoric acid, and particles of carbon, alumina and fluorine-containing compounds. These fumes are collected by a so-called primary circuit consisting of a skirt, a duct opening downwards, which is fixed to the anode tube and which extends over the entire length of that tube. At at least one of the ends of the cell, the fumes collected by this skirt are introduced into one or two burners consisting of a vertical tube drilled with air intake openings where the carbon-containing particles are burnt at the same time as the carbon monoxide. After combustion, the fumes are drawn under suction into a treatment circuit.

During electrolysis, the molten bath gives off fluorine-containing fumes with entrain particles of alumina. When the cell polarises, a sudden release of fluorine-containing products entraining alumina powder is added to these fumes. Hitherto, it has not been possible to remove all these fumes given off during electrolysis in the primary circuit, so that a fairly considerable proportion is discharged into the air of the workshop, so that this air has to be purified before it is exhausted into the open. Since this air, of considerable volume, has a very low noxious element content, its purification involves large, expensive installations and, in spite of this, is by no means complete. In addition, the atmosphere of the workshop makes work unpleasant.

In the case of cells with multiple precooked anodes, it is known that the gases given off during electrolysis can be collected by providing hoods covering the cell. A relatively small volume of air heavily laden with noxious products, so that it is easy to purify, is collected beneath the hoods. Hitherto, it has not been possible to use arrangements of this kind in Soederberg-anode cells because of the large quantities of soot and tar which emanate from coking of the anode and which are deposited in, and block, the pipes along which the fumes are transported towards the purification stages. On the other hand, the geometry of multiple precooked anodes, with their suspension rods, differs too greatly from that of a Soederberg-anode for simple adaptation of the hooding provided for multiple precooked anodes to be possible. The anode system consisting of an assembly of precooked anodes remains intact apart from its oxidation on contact with the electrolysis bath, whereas a Soederberg-anode, which as already mentioned is cooked during the electrolysis process, is the scene of complex phenomena. The distribution of temperature throughout the carbon mass has to be maintained. It has therefore been necessary to leave uncovered the surface of the bath covered by its crust and a layer of alumina, and to allow that proportion of the fumes, which are not collected by the primary circuit, to discharge into the air of the workshop and to purify all this air in a roof-mounted collection circuit with all the disadvantages referred to above.

The present invention relates to a process for collecting the fumes given off during the production of aluminium in a continuous-anode igneous electrolysis cell which obviates these disadvantages.

The invention also relates to an apparatus for carrying out this process.

In the process according to the invention, which applies to a cell whose continuous anode consists of a carbon mass accommodated in a tube and immersed in an electrolysis bath accommodated in a tank closed at its lower end by a cathode, the anode tube being provided at its lower end with a skirt forming a primary circuit for collecting the gases and dust given off during electrolysis, the surface of the electrolysis bath is closed, on the one hand along each of the long sides of the cell, by a displaceable longitudinal panel of which the upper edge is applied in fluid-tight manner to the anode tube, leaving an air intake between its lower edge and the tank, and on the other hand along each short side or "head" of the cell, by fixed hooding closed laterally by the two longitudinal panels. The hood gases, i.e. the gases and dust given off from the surface of the electrolysis bath, which are not collected by the primary circuit, and the air penetrating along the lower edge of the panel, are withdrawn under suction under at least one of the fixed hoodings.

The apparatus according to the invention consists of a hooding comprising, on the one hand along each of the long sides of the cell, a displaceable longitudinal panel covering the surface of the electrolysis bath between the anode tube and the tank, this panel being provided with sealing means along its upper side, whilst its lower side is arranged at a narrow distance from the tank so as to allow some intake of air, and on the other hand a fixed section which is mounted on each of the two cell heads and which is laterally closed by the panels with seals in between. The space defined above the cell head by the fixed sections of the hooding and the panels communicates through at least one pipe with an installation for treating the hood gases.

An exemplary embodiment of the invention is described in the following with reference to the accompanying drawings, wherein:

FIGS. 1 and 2 diagrammatically illustrate the principle on which the invention is based, FIG. 1 being a section through the cell in a transverse vertical plane, FIG. 2 being a section through a cell head in a longitudinal vertical plane.

FIGS. 3 to 13 show an exemplary industrial-scale embodiment.

FIG. 3 is a lateral elevation partly in section.

FIG. 4 is a section taken in a transverse vertical plane on its left-hand side, and an elevation looking from the cell head on its right-hand side.

FIG. 5 is a simplified section illustrating the movements of the panel.

FIGS. 6 and 7 are, respectively, a lateral elevation and a plan view of the guide rod with a counterweight.

FIGS. 8 and 9 are similar views of the guide rod without the counterweight.

FIGS. 10 and 11 are corresponding views of a driving crank rod.

FIGS. 12 and 13 show the two collection circuits on a cell head to illustrate the left-hand part of FIG. 3.

In these figures, the same components are denoted by the same reference numerals.

Figure 1:
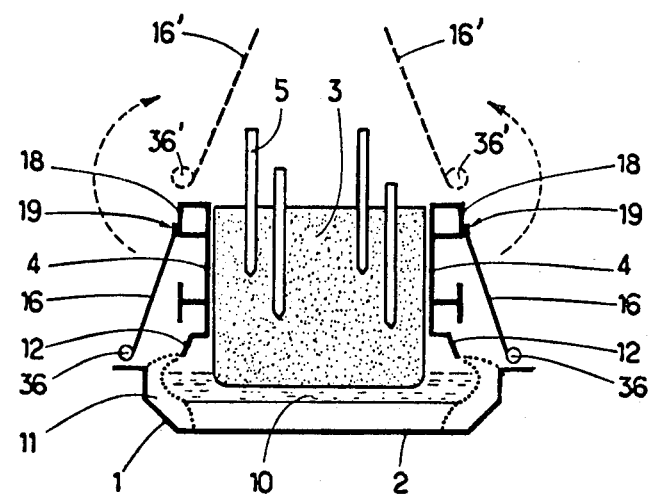
Figure 2:
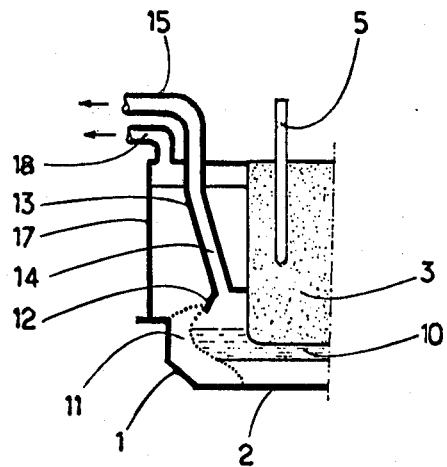
Figure 3:
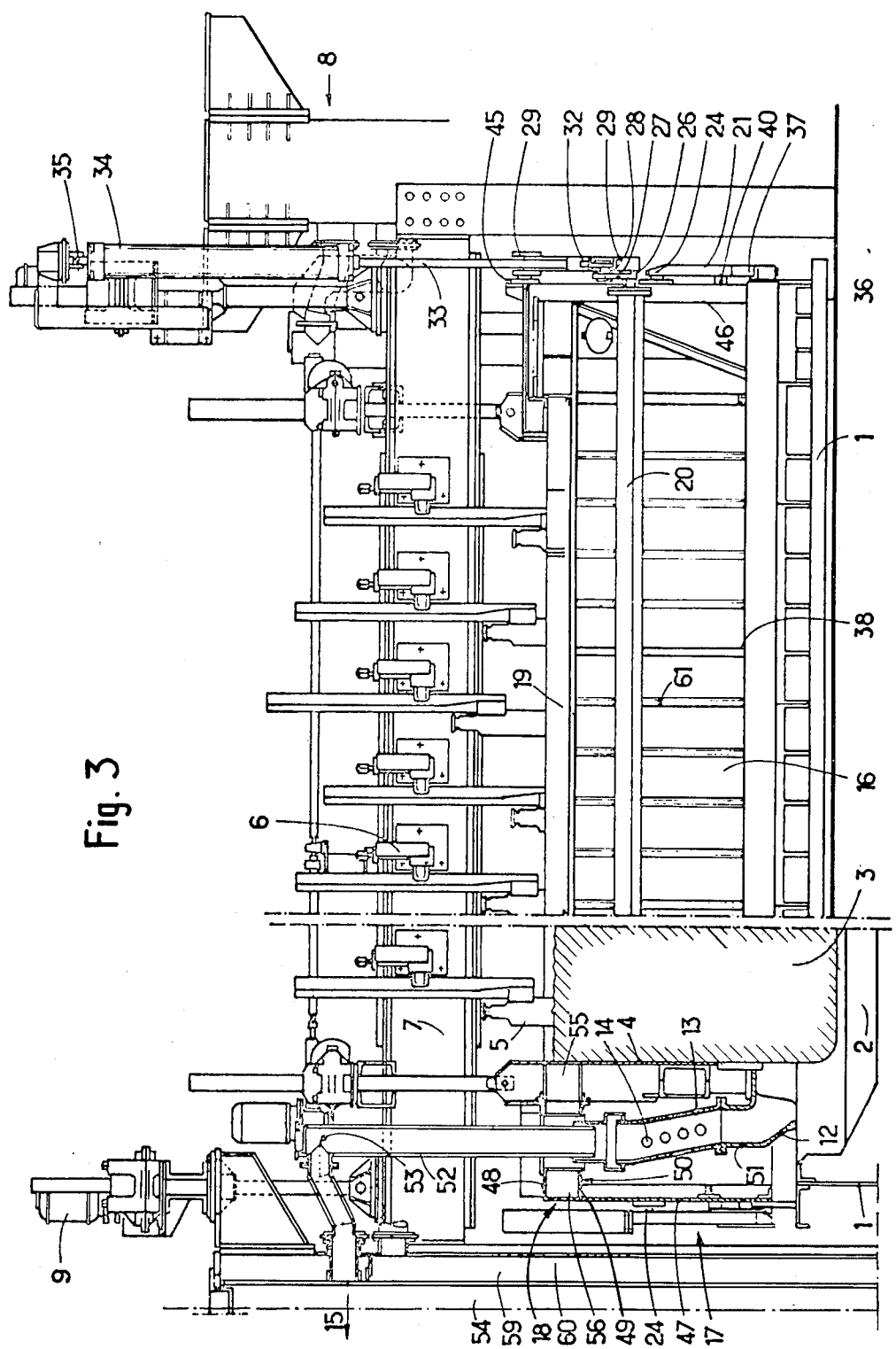
Figure 4:
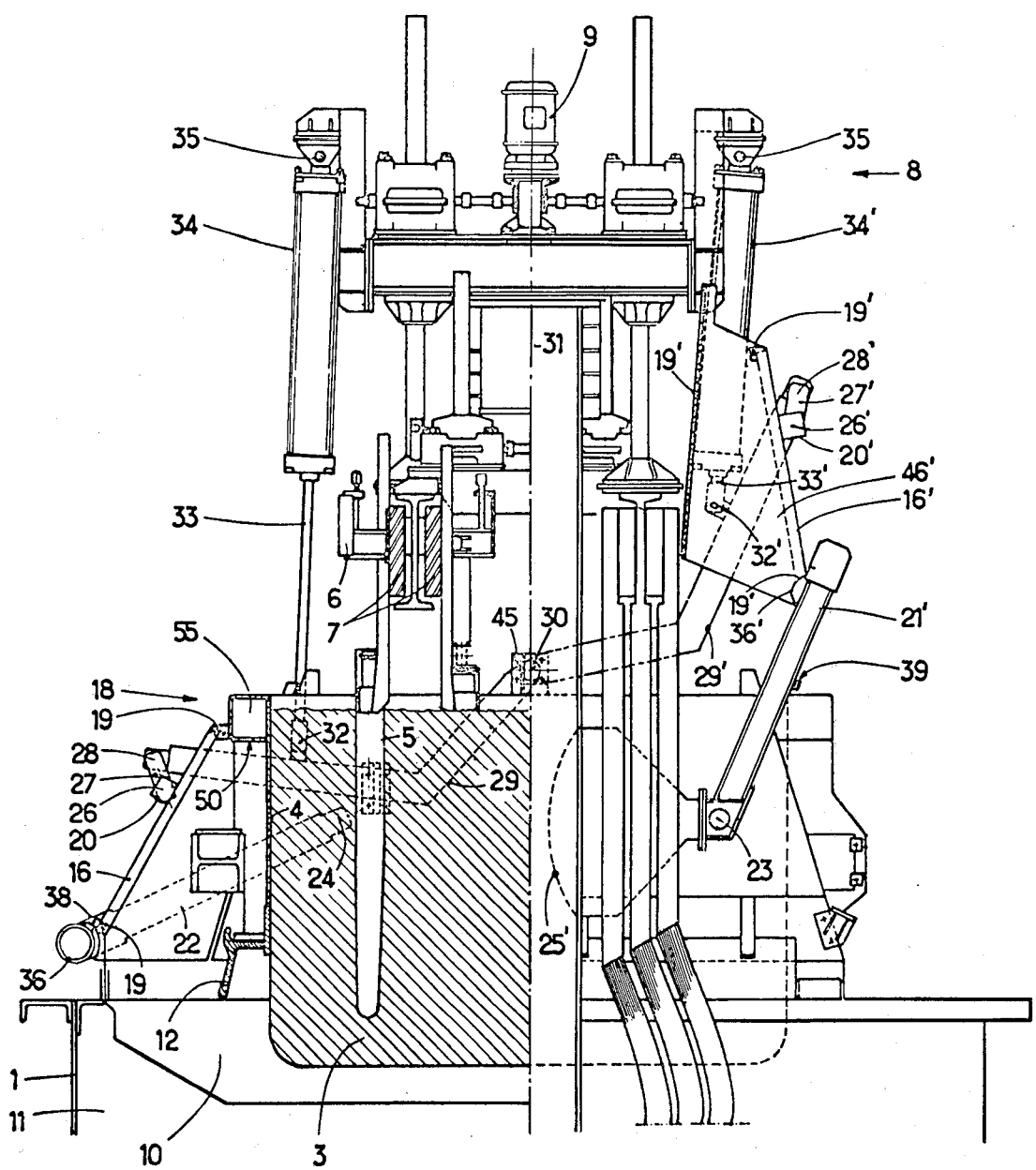
Figure 5:
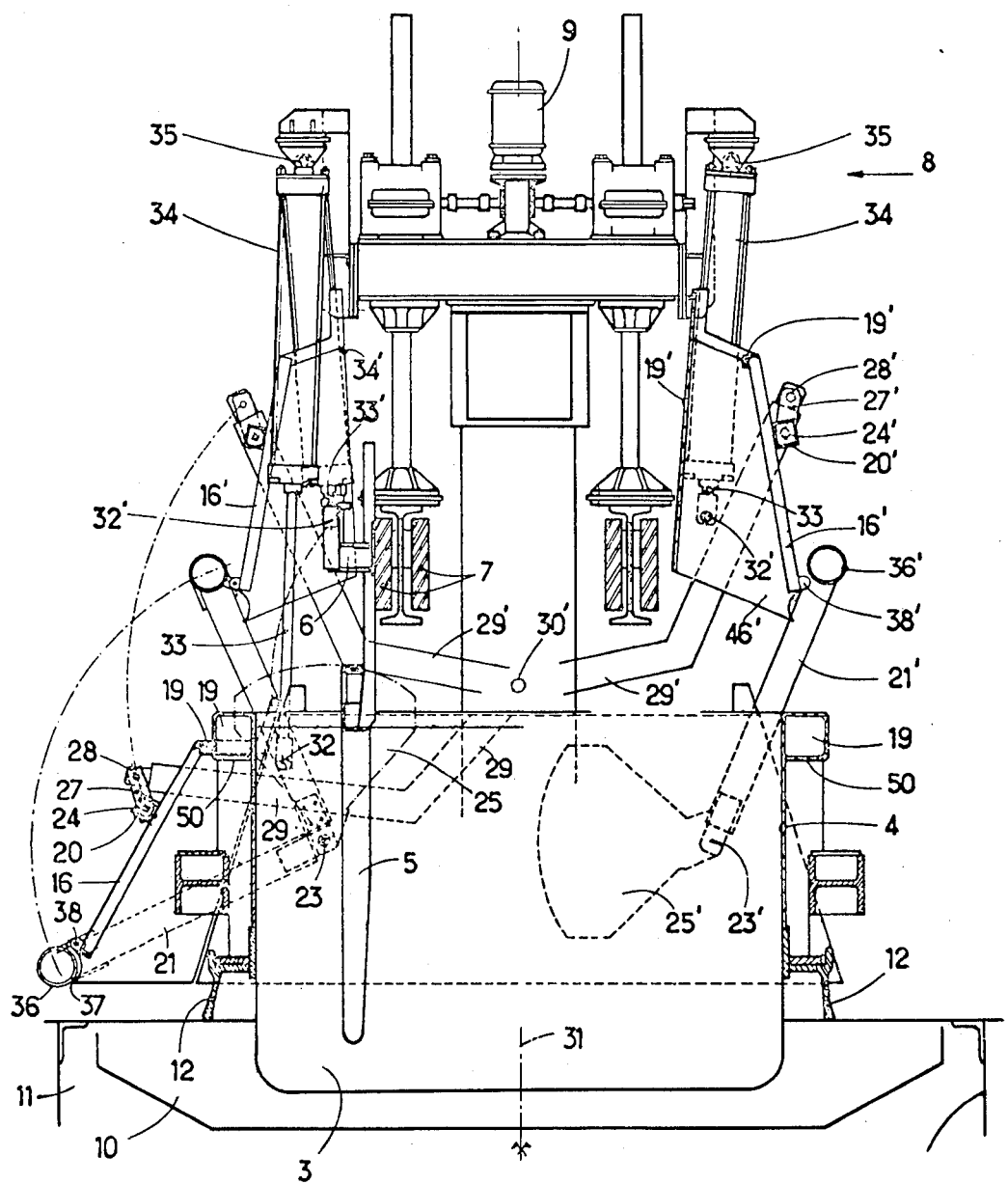
Figure 6:
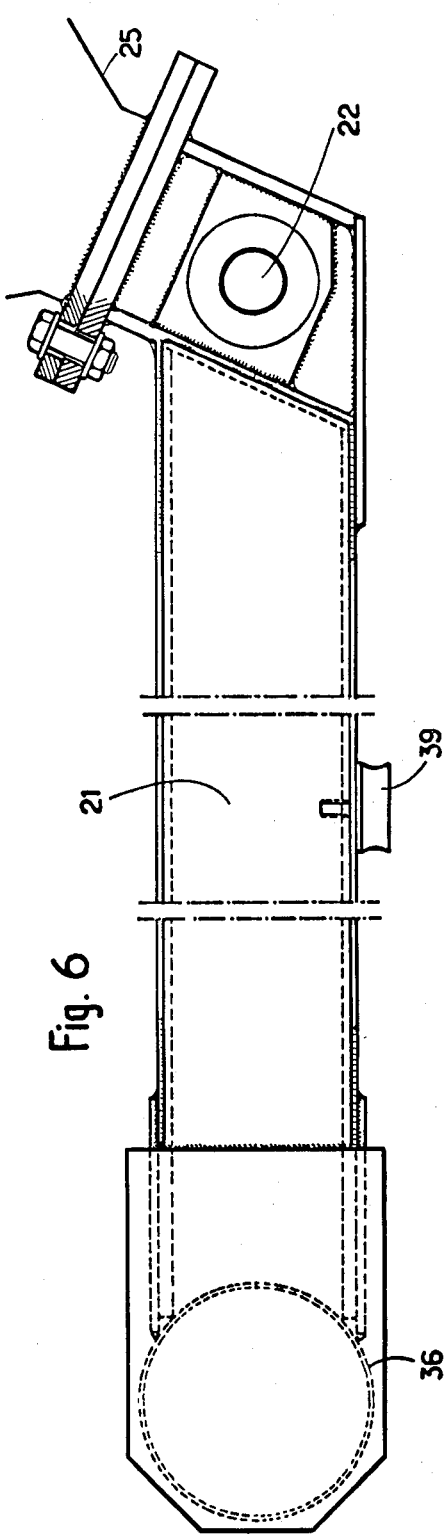
Figure 7:
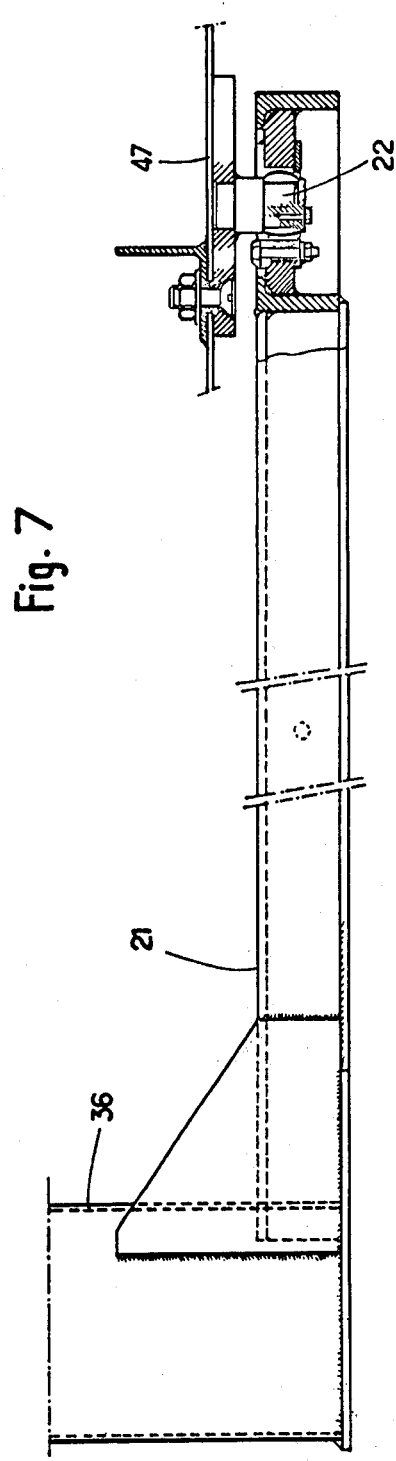

A cell for the electrolysis of alumina with a continuous so-called Soederberg anode comprises a tank 1 of which the base 2 is conductive and forms the cathode. The anode consists of a carbon mass 3 accommodated in a tube 4 open at its two horizontal bases. Pins 5 are embedded in the carbon mass. Each of the pins 5 is held by a clamp 6 against a bar 7 conductive to electrical current. These bars, generally two in number, are arranged longitudinally above the cell and are used both for supplying electricity and for mechanically suspending the anode. They are suspended from a superstructure 8, a motor 9 enabling them to be vertically displaced to make the carbon mass 3 descend through the tube 4 at a rate commensurate with the combustion of its lower part. The tank 1 contains an electrolysis bath 10 whose temperature, in the range from 950° to 1050° C, ensures that the carbon mass is cooked. On contact with the cold lateral walls of the tank, the electrolysis bath solidifies, forming an insulating slope 11 which serves as heat insulation. The surface of the bath is also solid and forms a very hard crust which is kept covered with alumina. The electrolysis bath is fed with alumina by breaking the crust, so that some of the alumina covering the bath falls into it, and then re-establishing this covering of alumina.

A lower collection circuit or primary circuit is fixed to the lower part of the tube, comprising a continuous skirt 12 which extends around it. This skirt collects the products of combustion of the anode. On at least one of the cell heads, this skirt opens onto a burner 13 which is in the form of a tube formed with air intake openings 14 and which is responsible for the combustion of carbon-containing dust and burnable gases collected by the skirt. The burnt gases are drawn under suction into a collecting tube 15.

Other types of dust and other gaseous products are given off from the surface of the electrolysis bath. Normally, they mix with the ambient air.

Attempts have been made to collect these particular products by covering the surface of the cell with a hood, i.e. by applying the solutions adopted for cells with precooked anodes. For the reasons given above, none of these attempts has proved successful.

According to the invention, the hooding used only covers the peripheral part of the cell situated between the anode tube 4 and the tank 1. The upper part of the anode, where the pins 5 are embedded, remains exposed. The entire hooding is connected to the tube 4 and follows its movements.

This hooding comprises, on the one hand along the long sides of the cell, two displaceable longitudinal panels 16 which are designed to retract at 16' above the anode (3-4) to allow access to the cell, and on the other hand along the cell heads, fixed sections 17 which are laterally closed in fluid-tight manner by the panel 16.

In addition to the primary circuit 12 to 15 described above, the gas collection system comprises a hood gas circuit or secondary circuit comprising a collector 18 at the upper end of the tube 4 which recovers the hood gases, i.e. the gases and dust given off from the surface of the bath. To this end, the collector 18 is formed with perforations at its lower end. It communicates with the space defined above the cell heads by the fixed hooding 17 and the panels 16.

The gas and dust collected on the one hand by the primary circuit and on the other hand by the secondary circuit are directed towards separate purification and recovery stages where they are optimally treated in high concentrations.

It should be noted that the hood gases form the combustion-supporting gas of the primary circuit burner which further increases the concentration of burnt gases.

It is important that the panel 16 should form a fluid-tight closure along its upper long side and along its lateral sides. Accordingly, it is provided with seals 19 along these sides. By contrast, along its long lower side, it has to allow a certain quantity of air in to enable the hood gases to be withdrawn under suction. Accordingly, this side is not provided with a seal and is arranged at a narrow distance from the edge of the tank 1 to provide for this intake of air.

Now that the principle of the apparatus has been explained, an exemplary industrial-scale embodiment will be described in the following.

Along each of its long sides, the Soederberg cell has an empty space between the anode tube 4 and the tank 1 of the cell. Each of these spaces is covered by a displaceable longitudinal panel 16 provided externally with a stiffening profile 20 of rectangular cross-section.

At each end of its lower edge, the panel 16 is pivotally connected to guide rods 21 and 22. At its other end, each of these guide rods is designed to pivot about a pin 23, 24 integral with the anode tube 4. One of these guide rods, namely the guide rod 21, is equipped with a counterweight 25, the counterweighted rods associated with the two panels 16 being situated on the same side of the anode. The control mechanism for the panels is situated on the other side of the anode, i.e. on the cell head without any counterweight.

On the side of this particular cell head, at one end of the stiffening profile 20, the panel 16 is pivotally connected at 26 to a crank 27 which itself is pivotally connected through a pin 28 to a driving crank lever 29 whose free end is designed to pivot about a pin 30 integral with the anode tube 4 and situated in the longitudinal axial plane 31 thereof. In addition, the mobile part 33 of a jack is pivotally connected to this rod at 32, the fixed part 34 of the jack being pivotal about a pin 35 integral with the superstructure 8 of the cell.

The guide rod 21, which is equipped with the counterweight 25, is welded to a tubular stiffener 36 of high strength. The other rod 22 is fixed to this stiffener through a joint 37. The stiffener 36 comprises joints 38 fixed on the other hand to the panel 16. Each guide rod may carry a guide pulley 39, 40.

The driving crank rod 29 comprises two elements 41 and 42 welded to one another to form an angled assembly. It can be seen that the driving rods associated with the two panels are situated in the same vertical plane, one terminating in a single socket 43 and the other in two flat sockets 44 surrounding sockets 43. The pivot 30 is mounted on a supporting plate 45 integral with the tube 4.

The panel 16 is provided with a seal 19 along its upper long side and its two lateral sides. By contrast, a clearance of a few millimeters is left along its lower long side to allow air through. The panel is heavily ribbed to form a rigid, non-deformable assembly. It is pointed out that the lateral sides of the panel 16 comprise lateral elements 46 intended to come into contact with the fixed sections 17 of the hooding mounted on the cell heads. It is these elements 46 which carry the lateral part of the seal 19.

In the figures, the panel and its fittings, when they are shown in the upper position, are denoted by references accompanied by an apostrophe. Thus, the panel which, in its lower position, is denoted by the reference 16 becomes 16' in the upper position. The movable part of the jack in its extended position is denoted by the reference 33, whereas in its retracted position it becomes 33', the retracted position corresponding to the upper position of the panel.

The fixed sections 17 of the hooding, mounted on the cell heads, each comprise a very strong outer vertical element 47 and an outer horizontal upper element 48 with a corresponding lower horizontal element 49. Between these two elements there is an empty space which forms part of the collector 18 for the gases given off from the surface of the bath. At its lower end, this collector is formed with openings 50 to allow gases and solid particles to be drawn through. All these elements are integral with the tube. The pivots 23, 24 and 30, around which pivot the driving rods 29 and the guide rods 21, 22 of the panels 16, are fixed to the outer vertical element 47. These fixed sections are laterally closed by the lateral part of the panels 16. On the other hand, the vertical element 47 is extended by the lateral element 46 of the panel 16.

The primary collection circuit is positioned between the anode tube 4 and the vertical element 47 of the head hooding. The primary collection circuit comprises the skirt 12 fixed to the lower end of the teeth 4. A tube 51, to which is fixed the burner 13 fed with combustion-supporting gas through the openings 14, is fixed to that part of the skirt 12 which corresponds to a cell head. This burner is surmounted by a tube 15 for collecting the burnt gases which comprises a vertical tube 52 traversing the horizontal elements 48 and 49 of the fixed head hooding, and which communicates through an elbow 53 with a monitor 54.

The hood gases are confined below the mobile hooding 16 and below the fixed hooding 17. These gases are drawn under suction through a horizontal collector 55 in the form of a square tube fixed to the upper part of the anode tube 4 and formed with perforations 50. The tube communicates with the space 56 between the horizontal elements 48 and 49 of the fixed head hooding. This space 56 communicates through a vertical tube 57 and an elbow 58 with the annular space 59 situated between the monitor 54 and an outer coaxial monitor 60. The monitor 55 and the annular collecting space 59 lead to an apparatus for purifying the air and for recovering alumina and fluorine-containing products present in the gases and particles collected.

It should be noted that each panel, together with its stiffening profile 20 and tubular stiffener 36, and also by virtue of its numerous ribs 61, forms an assembly of great strength so that only one driving rod 29 and a single jack 33-34 need be used for each of the panels. It is of course possible to provide a second driving rod 29 at the second end of each of the panels 16 and, if desired, a second jack 33-34 which enables the panels to be symmetrically controlled.

Figure 12:
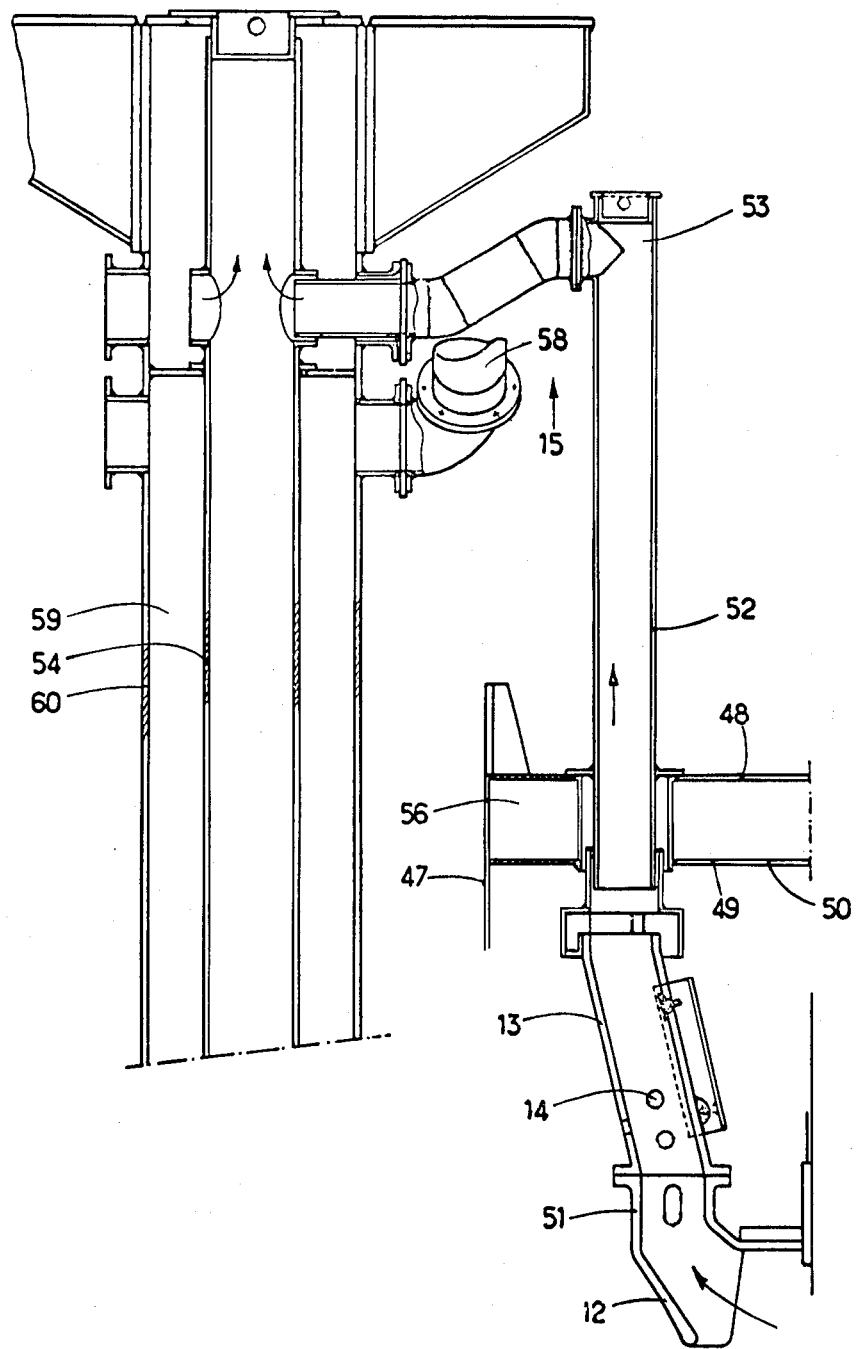
Figure 13:
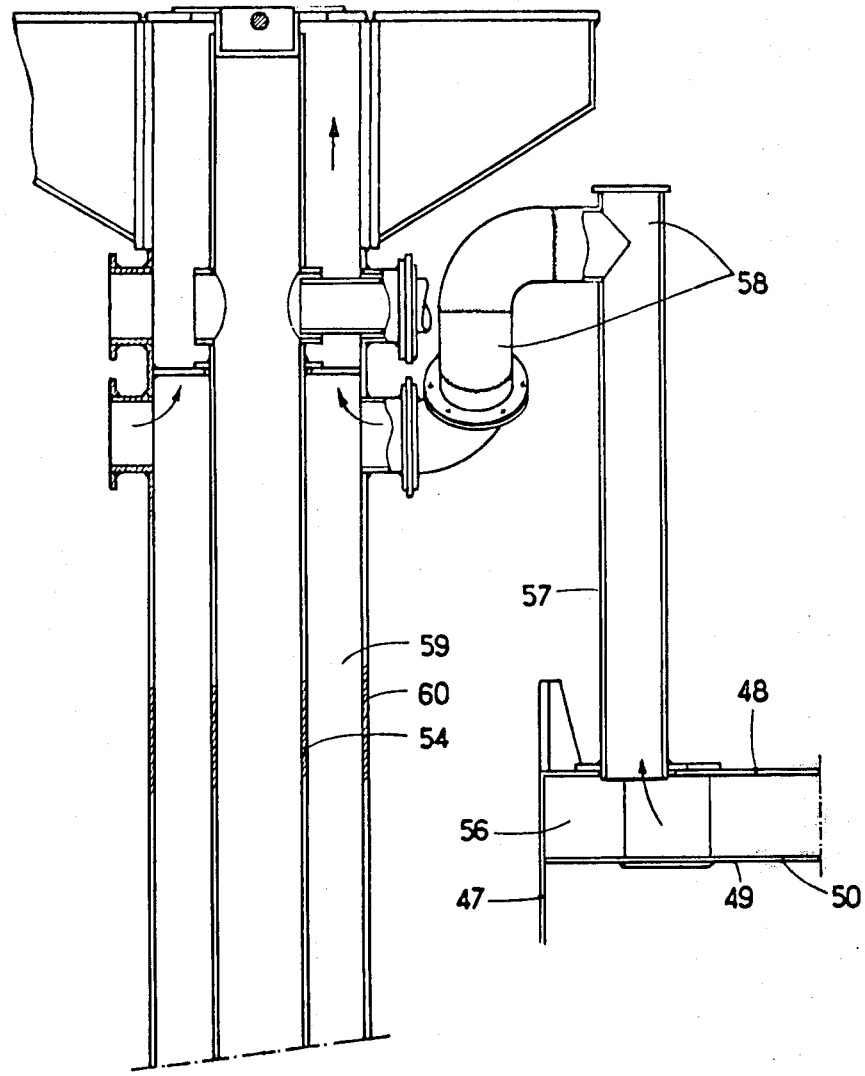

Similarly, if the fixed sections 17 of the hooding, i.e. the vertical element 47 and the horizontal elements 48, 49, are necessarily present on the two cell heads, the primary collection system and the secondary collection system may be provided either on only one of the heads or on both heads. The vertical tubes 54 and 60 are common to the rear head of one cell and to the front head of the adjacent cell, as can be seen from FIGS. 12 and 13.

The panels 16 retract at 16' under the action of the jack 33-34. This movement, during which the panel remains against the anode and the superstructure, takes place in such a way that the empty space between cells required for serving purposes is not reduced in size. In addition, the panel is not in any danger of striking personnel. Finally, when the panel is in its upper position, the space above the electrolysis bath along the long sides of the cell is completely released, so that the crust may be broken and the electrolysis bath fed without any particular precautions. On the cell heads, the empty space behind the tube 13 and below the element 48 is wide enough for the introduction of a crust-piercing hammer and the spout of the alumina container of the automatic servicing machines.

By virtue of the hooded cell, it is possible completely to separate the functions of collection, as performed by the primary collection circuit and the secondary collection circuit, and ventilation of the workshop. The air drawn in below the hood, for example at a rate of 1000 liters per second, is divided into two separate parts: 200 liters per second for the primary circuit, i.e. the burner, and 800 liters per second which are drawn in below the hood by the secondary circuit. By way of comparison, the conventional solution of the unhooded cell, discharging into the air of the workshop the gases and particles given off from the surface of the bath with collection at roof level, requires between 15 and 20 cubic meters per second per cell. The collection yield of the primary circuit is significantly improved because the combustion-supporting air is taken below the hood and, hence, itself contains a certain quantity of fluorine.

The primary collection yield is thus increased, which is extremely important sofar as the total collection yield is concerned. The gases given off below the hood, whose concentration is from 10 to 20 times higher than in conventional unhooded cells with collection at roof level, are much easier and less expensive to purify. Their purification is also more effective. For example, a workshop required 33 roof-mounted scrubbers with an output of 70 cubic meters per second. After hooding of the cells, the same workshop only needs seven scrubbers with an output of 15 cubic meters per second, in addition to which the purification effect is considerably improved.

The ventilation of a workshop comprising hooded cells may be studied to improve working conditions without having to take into account the difficulties brought about by the need to wash the air of the workshop which arise in the case of unhooded cells. In addition, hooding has the following advantages:

— better draught of the monitors through natural suction,
— lower carbon monoxide content,
— protection against radiation by the hooding of adjacent cells,
— ambient temperature below 6° to 7° C,
— investment for purifying the gases reduced by 25%, including the cost of hooding,
— reduction by half in the consumption of energy due to scrubbing,
— better purification of the air discharged into the atmosphere and, hence, less pollution.

The invention is applicable to cells for the igneous electrolysis of alumina using a continuous anode.

We claim:

1. A process for collecting the fumes given off during the production of aluminum in an electrolysis cell with a continuous anode consisting of a carbon mass accommodated in a tube and immersed in an electrolysis bath accommodated in a tank closed at its lower end by a cathode, comprising providing the lower end of the tube with a skirt forming a primary collection circuit for the gases and dust given off at the lower end of the anode, displacing a panel which extends longitudinally across the bath to within a short distance from the surface of the bath thereby permitting free flow of air through the narrow passage between the lower edge of the panel and the bath when in operative position, moving the panel in the direction away from the surface of the bath whereby access can be had to the surface of the bath when in raised position, closing the surface of the electrolysis bath along each of the short sides or cell "heads", by a fixed hooding closed laterally in fluid-tight manner by the two longitudinal panels, withdrawing the gases from the primary circuit and processing such gases for purification and treatment, separately withdrawing the gases from between the panel and the tube and separately processing such gases for purification and treatment.

* * * * *